Figure 1:
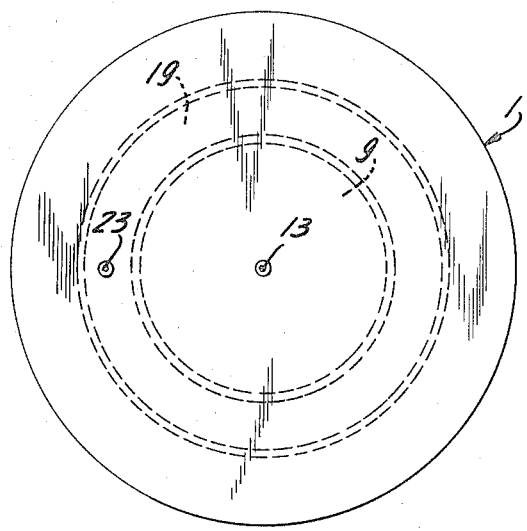

United States Patent [19]
Polye

[11] 3,858,097
[45] Dec. 31, 1974

[54] PRESSURE-SENSING CAPACITOR

[75] Inventor: William Ronald Polye, River Edge, N.J.

[73] Assignee: The Bendix Corporation, Teterboro, N.J.

[22] Filed: Dec. 26, 1973

[21] Appl. No.: 428,476

[52] U.S. Cl................ 317/248, 73/398 C, 317/246
[51] Int. Cl.............................................. H01g 7/00
[58] Field of Search................... 317/246, 247, 248; 73/398 C

[56] References Cited
UNITED STATES PATENTS
2,916,279    12/1959    Stanton............................. 317/246

FOREIGN PATENTS OR APPLICATIONS
2,021,479    11/1971    Germany........................ 373/398 C

*Primary Examiner*—E. A. Goldberg
*Attorney, Agent, or Firm*—S. H. Hartz; Anthony F. Cuoco

[57] ABSTRACT

A capacitance type pressure transducer which avoids errors due to changes in temperature has a pressure responsive capacitor and a fixed reference capacitor connected in a circuit to provide an output proportional to the ratio of the capacitances as a function of pressure. Since both capacitors are subjected to the same temperature changes any variations in capacitance due to temperature is cancelled out in the ratio.

7 Claims, 3 Drawing Figures

PATENTED DEC 31 1974          3,858,097

PRESSURE-SENSING CAPACITOR

The invention relates to pressure transducers and more particularly to pressure transducers of the capacitance type.

One of the problems encountered with capacitance type pressure transducers as used heretofore is the error caused by temperature changes which causes the distance between the capacitor plates to change due to thermal expansion. When the pressure transducer is used in aircraft it may be subject to a wide range of temperatures and the magnitude of error mainly depends upon the materials of construction, design details and the operating temperature range. Difficulties are encountered in achieving the desired degree of capacitor stability, especially when the system is subjected to extreme temperature variations.

In most instances a reference capacitor is used for converting transducer capacitance changes to output electrical signals. The reference capacitor and pressure sensing capacitor may be connected in the arms of a bridge circuit or one of the capacitors may be connected to the input of an amplifier and the other capacitor connected in a feedback path around the amplifier so that the output signal is proportional to the ratio of the two capacitors and is a function of pressure.

The present invention avoids errors caused by temperature changes of the transducer by constructing the reference capacitor as an integral part of the transducer so that the reference capacitor and the pressure sensing capacitor are both subjected to the same temperatures. Any variation in capacitance of the capacitors caused by temperature cancels out since the pressure signal is proportional to the ratio of the two capacitors and both capacitors are subjected to the same changes in temperature.

The invention contemplates a pressure transducer of the capacitance type comprising a hollow body having spaced opposing walls supported at their edges, the portions of the walls spaced from the edges being deflectable relative to one another in response to changes in pressure and the portions of the walls adjacent the edges being substantially nondeflectable relative to one another with changes in pressure, electrical conducting means on the deflectable portions of said walls forming the plates of a pressure sensitive capacitor, and electrical conducting means on the substantially nondeflectable portions of said walls forming the plates of a reference capacitor.

One object of the invention is to provide a pressure transducer of the capacitance type which may be subjected to wide variations in temperature without affecting the accuracy of the pressure signal therefrom.

Another object of the invention is to construct the pressure transducer so that the reference capacitor is an integral part of the transducer.

Another object of the invention is to position the capacitor plates of both capacitors on the same surfaces of the pressure transducer, but arrange the capacitor plates of the pressure sensing capacitor so that they respond to pressure changes and arrange the plates of the reference capacitor so that they are not affected by pressure changes.

These and other objects and advantages of the invention will appear more fully hereinafter from a consideration of the detailed description which follows, taken together with the accompanying drawings wherein one embodiment of the invention is illustrated by way of example. It is to be understood, however, that the drawings are for the purpose of illustration only and are not a definition of the limits of the invention, reference being had to the appended claims.

Figure 2:
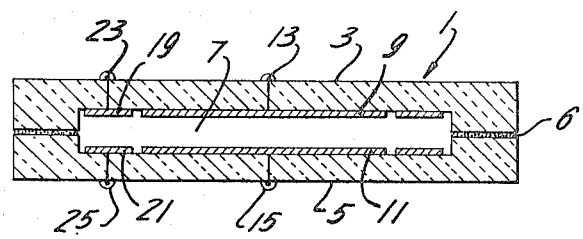
Figure 3:
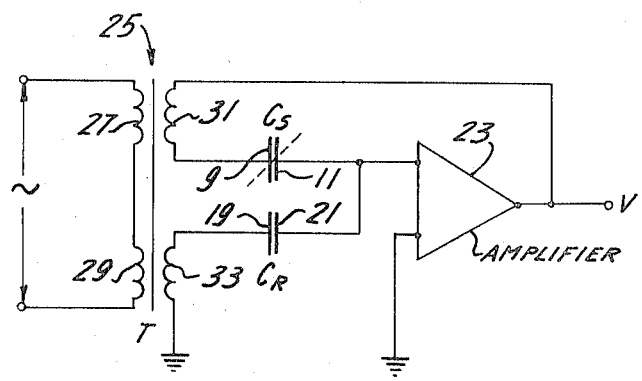

In the drawing,

FIG. 1 is a plan view of a pressure sensor constructed according to the invention, FIG. 2 is a vertical sectional view of the pressure sensor, and FIG. 3 is a circuit diagram for providing an output signal proportional to the ratio of the two capacitors as a function of pressure.

Referring to FIG. 1 and FIG. 2, the novel pressure transducer shown therein and constructed according to the invention, comprises a body 1 of dielectric material such as glass or quartz. The body is formed of a pair of shallow cup-like members 3, 5 sealed together at their edges by suitable means 6 to provide a chamber 7 therebetween which may be evacuated in a well-known manner. Pressure sensing conducting plates 9, 11 are deposited on opposing inner faces of the deflecting portions of members 3, 5 by vacuum evaporation or sputtering and form a capacitor which provides a signal corresponding to the pressure applied externally of body 1. Conducting plates 19, 21 also are deposited on the opposing inner faces of members 3, 5 adjacent seals 6 on the nondeflecting portions of members 3, 5 and form a reference capacitor which provides a reference signal. Suitable electrical conductors 13, 15 and 23, 25 may be connected to capacitor plates 9, 11 and 19, 21, respectively, for connecting the capacitor in an electrical circuit as shown in FIG. 3.

Capacitor plates 9, 11 are circular and are positioned substantially centrally on the opposing inner faces of members 3 and 5 and capacitor plates 19, 21 are annular and are positioned at the edges of opposing inner faces of members 3 and 5. With this arrangement pressure changes applied externally of body 1 causes capacitor plates 9, 11 to move relative to one another and provide a signal corresponding to the applied pressure, whereas capacitor plates 19 and 21 are substantially stationary and are not appreciably affected by the change in pressure and provide a reference signal.

The deflection of the pressure sensitive circular plates 3, 5 is represented by the following equation:

$$y = 3W(m^2 - 1)/16\pi Em^2 t^3 \, [1 \, (a^2 - r^2)^2/a^2] \tag{1}$$

Where
$W$ = pressure
$m$ = reciprocal of Poisson's ratio
$a$ = disc radius (to inside edge of seal)
$r$ = radial distance at deflection $y$
$t$ = disc thickness
$E$ = Young's modulus Maximum deflection of members 3, 5 is at the center ($r=0$), and the deflection ratio of any point $r$ and at center is:

$$y/y_{max} = 1 \, (a^2 - r^2)^2/a^4 \tag{2}$$

The deflection of members 3, 5 at their edges may be computed using equation (1) and this deflection is so small that it permits the referenced capacitor to be formed on members 3, 5 with no appreciable change in capacitance over the pressure range being measured. Any small change in capacitance may be readily calibrated in the system.

The capacitance $C_S$ of the pressure sensitive capacitor and the capacitance $C_R$ of the reference capacitor preferably are made equal at the lowest pressure to be measured and this may be accomplished by making the area of capacitor plates 9, 11 equal to the area of capacitor plates 19, 21 and maintaining equal distances between capacitor plates 9, 11 and 19, 21. However, since capacitance C of a capacitor changes in accordance with the following equation:

$$C = K A/D \qquad (3)$$

Where
 A is the area of the plates,
 D is the distance between the plates, and
 K is a constant of proportionality
the distance between the capacitor plates and their area may be varied in accordance with the equation and still maintain the capacitances $C_S$ and $C_R$.

The change in spacing between the capacitor plates caused by thermal expansion of members 3, 5 with changes in temperature affect both capacitance $C_S$ and $C_R$ substantially the same amount thus eliminating changes in the output signal ratio which would result from thermal expansion.

To avoid introduction of active capacitance in the electrical measurements a thin film metallic coating 17 may be provided on the external surfaces of body 1 to provide an electrostatic shield as described in U.S. Pat. No. 3,715,638.

Referring to FIG. 3, the reference capacitor 19, 21 may be connected to the input of an amplifier 23 and the pressure sensing capacitor 9, 11 may be connected in a feedback path about amplifier 23. The capacitors are energized by a transformer 25 having primary windings 27, 29 connected to an alternating current source and inductively coupled to secondary windings 31, 33 connected to capacitors 9, 11 and 19, 21, respectively. The circuit provides a signal V at the output of amplifier 3 which is proportional to the ratio of capacitance $C_S$ of pressure sensing capacitor 9, 11 and capacitance $C_R$ of reference capacitor 19, 21. Since capacitance $C_S$ changes with pressure and capacitance $C_R$ is fixed the signal V is a function of pressure.

By constructing the reference capacitor and pressure sensitive capacitor as integral parts of the transducer both capacitors are affected equally by variations in temperature and little or no error appears in pressure signal V because of temperature changes. An economic advantage is that both capacitors are included in a single component.

What is claimed is:

1. A pressure transducer of the capacitance type comprising a hollow body having spaced opposing walls of insulating material supported at their edges, the portions of the walls spaced from the edges being deflectable relative to one another in response to changes in pressure and the portions of the walls adjacent the edges being substantially nondeflectable relative to one another with changes in pressure, electrical conducting means on opposing surfaces of the deflectable portions of said walls forming the plates of a pressure sensitive capacitor, and electrical conducting means on opposing surfaces of the substantially nondeflectable portions of said walls forming the plates of a reference capacitor.

2. A pressure transducer as described in claim 1 adapted for use in an environment which changes temperature over a substantially wide range, the capacitors being formed and arranged to change capacitance corresponding amounts due to changes in temperature.

3. A pressure transducer as described in claim 1 having means for connecting the capacitor plates in a circuit to provide an output proportional to the ratio of the capacitors.

4. A pressure transducer as described in claim 1 in which the hollow body is made of quartz.

5. A pressure transducer of the kind described in claim 1 in which the body is circular and the spaced opposing walls are supported circumferentially at their edges.

6. A pressure transducer as described in claim 1 in which the capacitances of the pressure sensitive capacitor and the reference capacitor are equal.

7. A pressure transducer of the capacitance type comprising a hollow circular body having spaced opposing walls supported circumferentially at their edges, the portions of the walls spaced from the edges being deflectable relative to one another in response to changes in pressure and the portions of the walls adjacent the edges being substantially nondeflectable relative to one another with changes in pressure, circular electrical conducting means positioned centrally on the deflectable portions of said walls forming the plates of a pressure sensitive capacitor, and annular electrical conducting means positioned adjacent the edges on the substantially non deflectable portions of said walls forming the plates of a reference capacitor.

* * * * *